United States Patent
Carvalho et al.

(10) Patent No.: US 11,409,732 B2
(45) Date of Patent: Aug. 9, 2022

(54) COMPUTER ESTIMATIONS BASED ON STATISTICAL TREE STRUCTURES

(71) Applicant: Intuit Inc., Mountain View, CA (US)

(72) Inventors: Vitor R. Carvalho, San Diego, CA (US); Janani Kalyanam, San Diego, CA (US); Leah Zhao, San Diego, CA (US); Peter Ouyang, Del Mar, CA (US)

(73) Assignee: Intuit Inc., Mountain View, CA (US)

( * ) Notice: Subject to any disclaimer, the term of this patent is extended or adjusted under 35 U.S.C. 154(b) by 323 days.

(21) Appl. No.: 16/745,604

(22) Filed: Jan. 17, 2020

(65) Prior Publication Data

US 2021/0224247 A1   Jul. 22, 2021

(51) Int. Cl.
*G06F 16/23* (2019.01)
*G06F 16/2458* (2019.01)
*G06F 16/22* (2019.01)

(52) U.S. Cl.
CPC ...... *G06F 16/2365* (2019.01); *G06F 16/2246* (2019.01); *G06F 16/2462* (2019.01)

(58) Field of Classification Search
CPC ............. G06F 16/2365; G06F 16/2246; G06F 16/2462; G06F 16/9027
USPC ................................................ 707/690, 797
See application file for complete search history.

(56) References Cited

U.S. PATENT DOCUMENTS

2005/0050016 A1* 3/2005 Stanoi ................. G06F 16/9027
2009/0030864 A1* 1/2009 Pednault ................ G06N 5/003
706/45

OTHER PUBLICATIONS

Ram, P., et al., "Density Estimation Trees", KDD'11, Aug. 21-24, 2011, 9 pages.
Ram, P., et al., "Fraud Detection with Density Estimation Trees", Proceedings of Machine Learning Research, KDD Workshop on Anomaly Detection in Finance, Jan. 1, 2017, 10 pages.

* cited by examiner

*Primary Examiner* — Michael Pham
(74) *Attorney, Agent, or Firm* — Ferguson Braswell Fraser Kubasta PC

(57) ABSTRACT

A method for computer estimations based on statistical tree structures involves obtaining a statistical tree structure for reference elements. The statistical tree structure includes leaf nodes segmenting a statistic for a data label according to data features in the reference elements, and intermediate nodes connecting a first node to the leaf nodes. Each of the first node and the intermediate nodes provide a branching based on one of the data features. The method further includes obtaining target data, including values for the data features, and a value for the data label. The method also includes selecting the first node, associated with a first data feature, traversing the statistical tree structure to a leaf node by matching the values of the data features to the branching of the intermediate nodes, and assessing the value for the data label in the target data based on the statistic associated with the leaf node.

19 Claims, 5 Drawing Sheets

COMPUTER ESTIMATIONS BASED ON STATISTICAL TREE STRUCTURES

BACKGROUND

Understanding the statistics of data may be beneficial for many reasons. For example, based on the statistics, errors may be detected, predictions may be made, etc. However, it may be challenging for a computer to accurately compute certain statistics for high-dimensional data. In addition, the benefit of the statistics may be limited under various circumstances, such as when the underlying data has a high variance.

SUMMARY

In general, in one aspect, one or more embodiments relate to a method for computer estimations based on statistical tree structures, the method comprising: obtaining a statistical tree structure for a plurality of reference elements, the statistical tree structure comprising: a plurality of leaf nodes segmenting a statistic for a data label according to a plurality of data features in the plurality of reference elements, and a plurality of intermediate nodes connecting a first node to the plurality of leaf nodes, wherein the first node and each of the plurality of intermediate nodes provide a branching based on one of the plurality of data features; obtaining target data comprising: a plurality of values for the plurality of data features, and a value for the data label; selecting the first node of the statistical tree structure; traversing the statistical tree structure to a first leaf node, the traversing comprising matching one of the plurality of values of the plurality of data features to the branching of one of the plurality of intermediate nodes; and assessing the value for the data label in view of the statistic associated with the first leaf node.

In general, in one aspect, one or more embodiments relate to a method for computer estimations based on statistical tree structures, the method comprising: obtaining a statistical tree structure for a plurality of reference elements, the statistical tree structure comprising: a plurality of leaf nodes segmenting a statistic for a data label according to a plurality of data features in the plurality of reference elements, and a plurality of intermediate nodes connecting a first node to the plurality of leaf nodes, wherein the first node and each of the plurality of intermediate nodes provide a branching based on one of the plurality of data features, wherein the obtaining of the statistical tree structure comprises: branching into two branches at the first node based on a condition established using a first of the plurality of data features; assigning a first subset of the plurality of reference elements to a first branch of the two branches, based on values of the first data feature of the first subset of the plurality of reference elements meeting the condition; and assigning a second subset of the plurality of reference elements to a second branch of the two branches, based on the values of the first data feature of the second subset of the plurality of reference elements not meeting the condition, wherein the condition is selected to minimize a variance of the values of the first data feature of the first subset and a variance of the values of the first data feature of the second subset.

In general, in one aspect, one or more embodiments relate to a system for computer estimations based on statistical tree structures, the system comprising: a computer processor; a statistical tree structure training module executing on the computer processor configured to obtain a statistical tree structure for a plurality of reference elements, the statistical tree structure comprising: a plurality of leaf nodes segmenting a statistic for a data label according to a plurality of data features, and a plurality of intermediate nodes connecting a first node to the plurality of leaf nodes, wherein the first node and each of the plurality of intermediate nodes provide a branching based on one of the plurality of data features; and an evaluation module executing on the computer processor configured to: obtain target data comprising: a plurality of values for the plurality of data features, and a value for the data label; select the first node of the statistical tree structure in the descending order, the first node being associated with a first data feature of the plurality of data features; traverse the statistical tree structure to a first leaf node by matching one of the plurality of values of the plurality of data features to the branching of one of the plurality of intermediate nodes; and assess the value for the data label in the target data in view of the statistic associated with the first leaf node.

Other aspects of the invention will be apparent from the following description and the appended claims.

DETAILED DESCRIPTION

Figure 1:
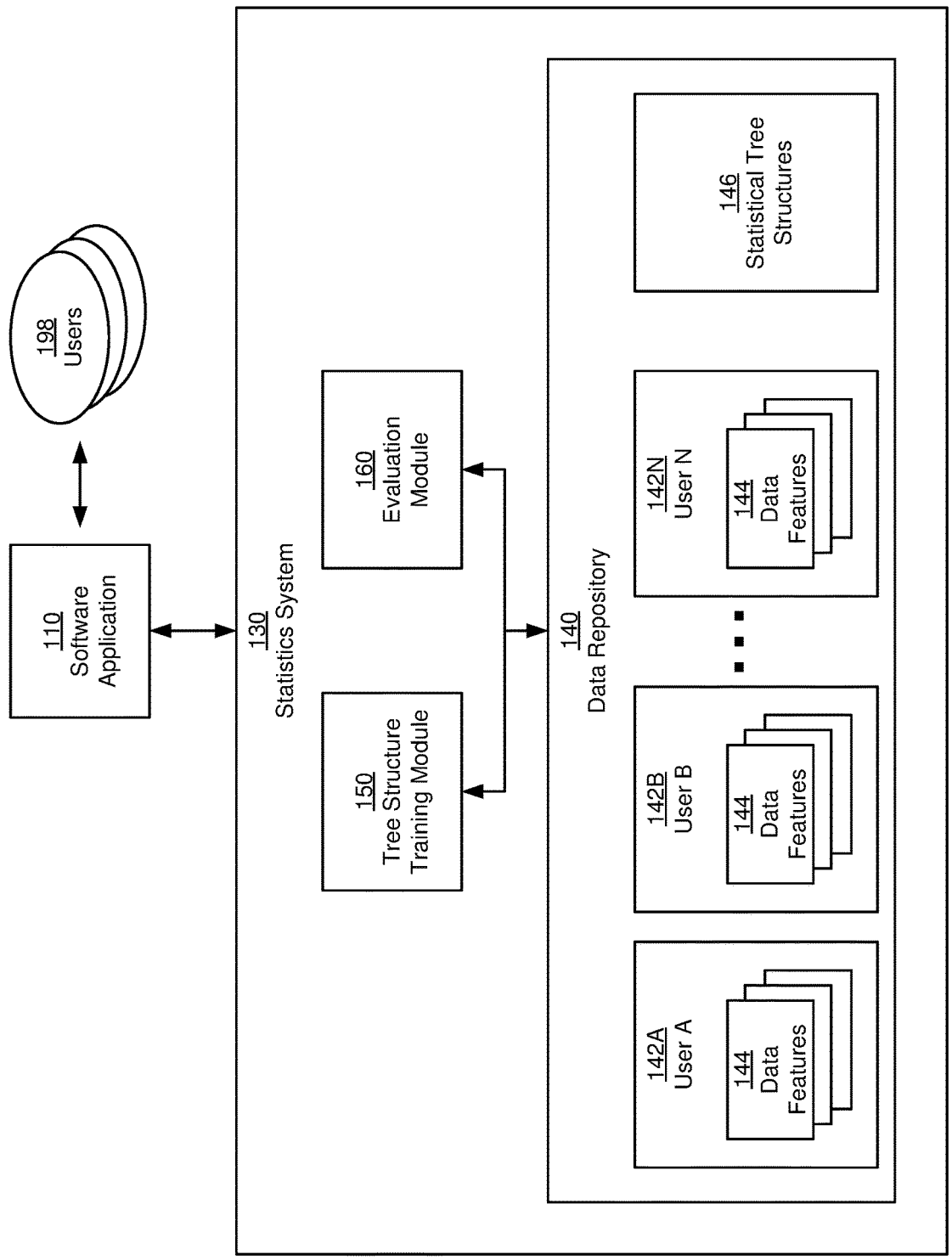
FIG. 1 shows a system for computer estimations based on statistical tree structures, in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to computer estimations based on statistical tree structures. The estimation may involve an estimation of a probability density and/or other statistics. Embodiments of the disclosure may generate individualized probability densities and/or other statistics to provide meaningful statistical insight where a single statistical operation would provide less insight. Thus, a computer is capable of providing a more accurate estimate of the statistic than without the statistical tree structures.

Consider, for example, a probability density for an income. The probability density and/or other statistics are likely to be different for persons of different age, socioeconomic background, etc. When a statistic, e.g., a probability density, is computed over the entire population of persons, due to the lack of homogeneity in the population, the probability density may be rather broad and not particularly informative. Similar issues may exist with other statistics. In one or more embodiments, to obtain a sufficiently informative probability density and/or other statistics, data features that reduce the homogeneity of the statistics may be explicitly considered. Specifically, by the computing system using data structures in the format of a statistical tree structure that has levels based on the data features that reduce homogeneity, the computing system is capable of providing a more accurate estimation of the statistic. Accordingly, explicit consideration of the data features that may affect the probability density and/or other statistics allows for considerably more accurate predictions, as the subsequent discussion of systems and methods will show. Broadly speaking, embodiments of the disclosure model the conditional probability p(y|X), where y is a label for which a prediction is desired, and X is a set of feature data thought to be affecting the label.

Embodiments of the disclosure may be used in various ways to detect outliers and possible errors, make predictions or recommendations, etc. Various applications are described below, following a description of embodiments of the disclosure.

The subsequent paragraphs describe methods and systems for computer estimations based on statistical trees, in accordance with one or more embodiments. First, a system is described, followed by methods implemented on the system.

Turning to FIG. 1, a statistics system (130), interfacing with a software application (110) in accordance with one or more embodiments, is shown. Each of these components is subsequently described.

Figure 5A:
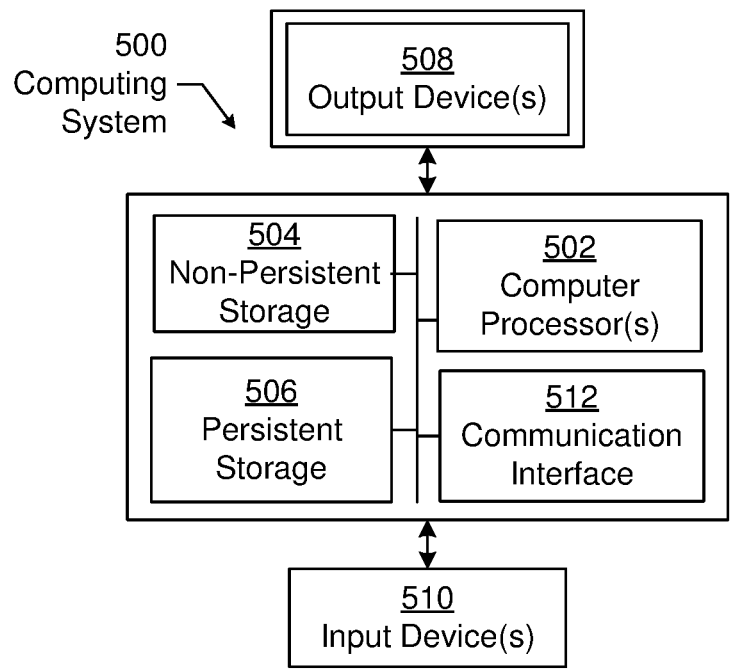
FIG. 5A and FIG. 5B show computing systems, in accordance with one or more embodiments of the disclosure.
Figure 5B:
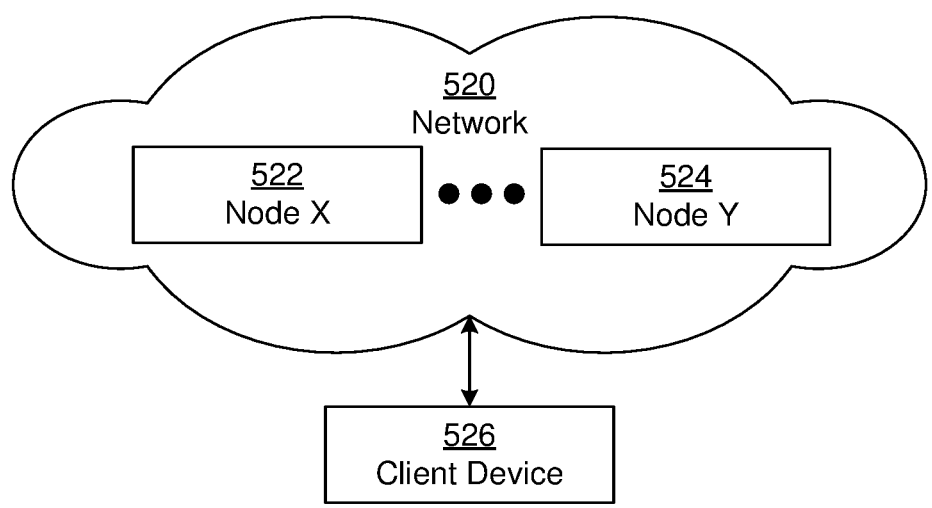

The software application (110) may be accessed by users (198). The users (198) may be an individual, group of individuals (e.g., family), or organization (e.g., business entity, charitable entity, etc.). The software application (110) may provide one or more functionalities to support, for example, accounting tasks, tax calculation tasks, record keeping or other administrative tasks, multimedia applications, gaming, social network tasks, etc. The software application (110) may be hosted on a computing system. An example computing system is shown in FIG. 5A and FIG. 5B. In one or more embodiments, at least parts of the software service (110) are cloud-hosted.

Figure 2:
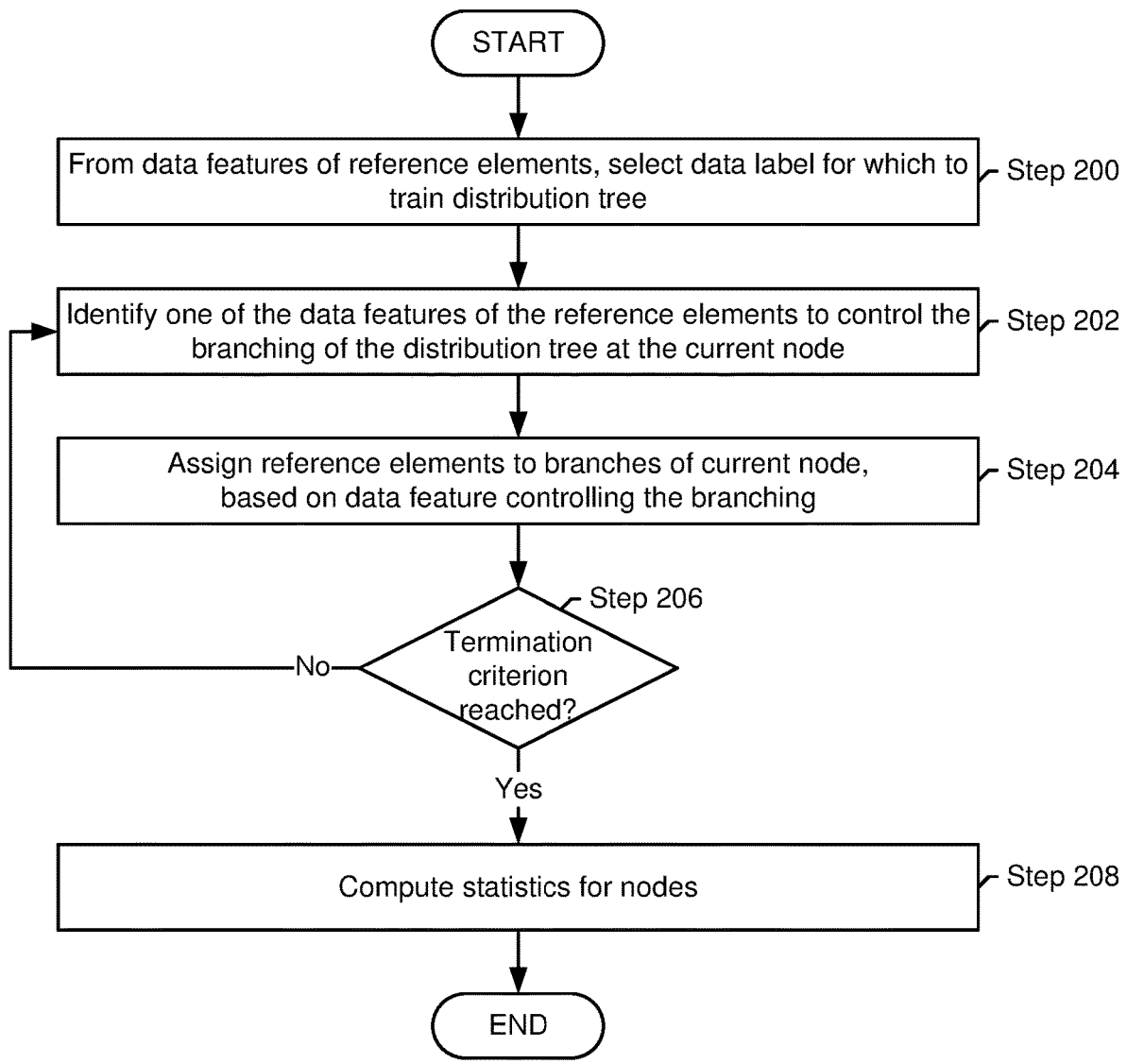
FIG. 2 shows a flowchart describing the generation of a statistical tree structure, in accordance with one or more embodiments of the disclosure.
Figure 3:
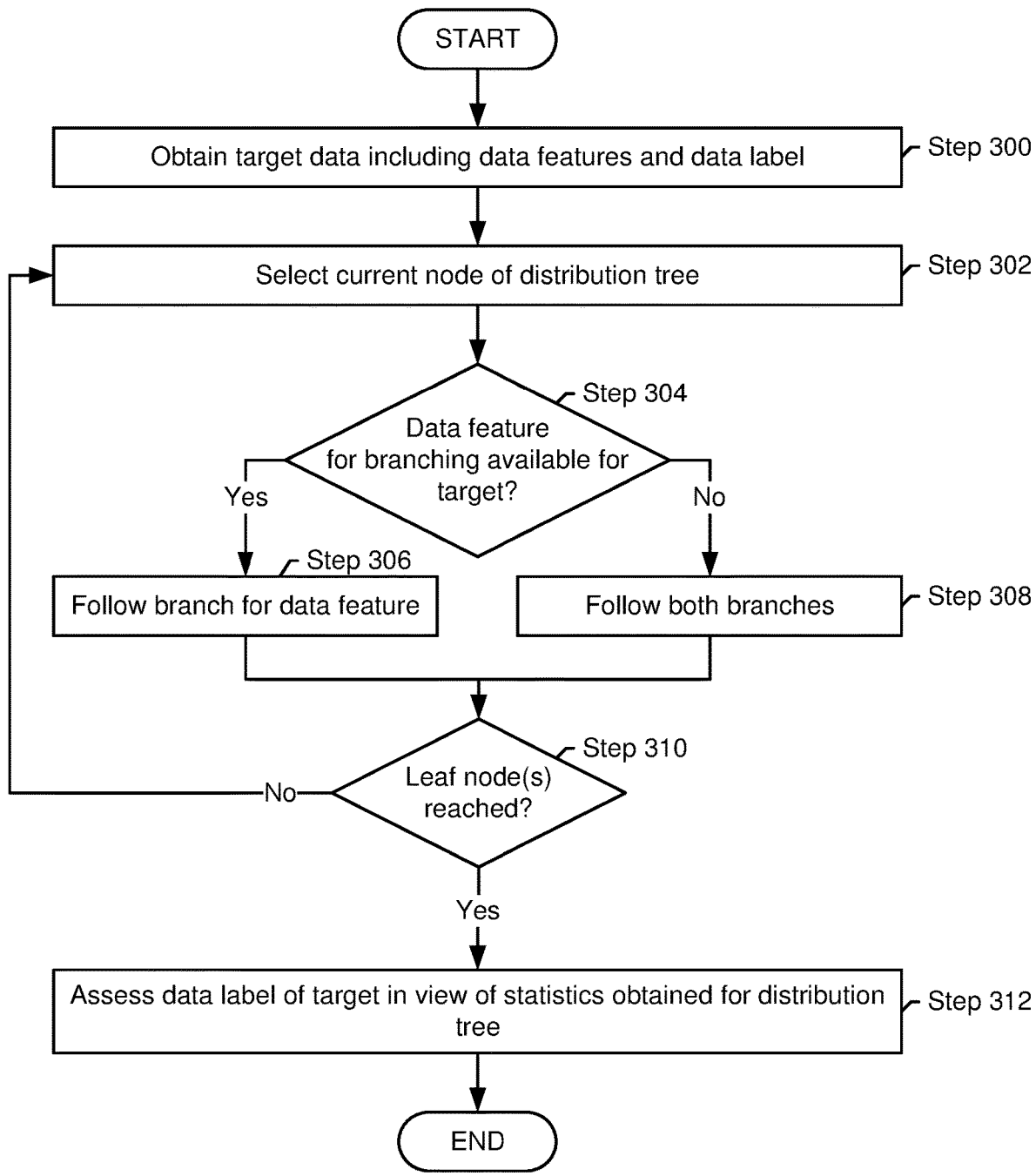
FIG. 3 shows a flowchart describing the assessment of target data based on the statistical tree structure, in accordance with one or more embodiments of the disclosure.

The statistics system (130) may perform estimations based on statistical tree structures, in accordance with one or more embodiments, by executing a set of machine-readable instructions (stored on a computer-readable medium) which perform one or more of the operations described in the flowcharts of FIG. 2 and FIG. 3. Broadly speaking, the statistics system (130) may be used to address the technical problem of a computer accurately performing probability density estimation or other statistical operations. The probability density estimation may be used to construct an estimate of a probability density function based on observed data (e.g., a limited number of samples) even though the underlying probability density function itself is typically unobservable. The samples used for constructing the estimate of the probability density function may be random samples obtained from a large population of samples that form the underlying probability density function.

For higher-dimensional data, probability density estimation (and other statistical operations) can be extremely challenging. This may be the case, for example, when for the conditional probability p(|IX), X includes many data features, sometimes 10 s, 100 s, or more data features, that affect the target data field. Depending on how these data features affect the target data field, the resulting density estimate may become very broad, as previously discussed. To address this issue, embodiments of the disclosure lower the effective dimensionality of the data, prior to computing statistics. The statistics system (130) uses stored statistical tree structures, discussed in detail below, to lower the effective dimensionality. Many distributions trees may be generated to enable a statistical analysis of different aspects of the initially high-dimensional data.

The statistics system (130) includes a data repository (140), a tree structure training module (150), and an evaluation module (160). The components of the statistics system (130) are described below.

The data repository (140) may be any type of storage unit and/or device (e.g., a file system, database, collection of tables, or any other storage mechanism) for storing data. The data repository (140) may include multiple different storage units and/or devices. The multiple different storage units and/or devices may or may not be of the same type or located at the same physical site.

The data repository (140) may store data of the users (198) of the software application (110). Comprehensive data sets including many data features may be stored for many users. Tens, hundreds or thousands of data features may exist for each user. These data features may include numerical and/or categorical data. Numerical data is data whose value is a number whereas categorical data is data whose value is a category. In the example shown in FIG. 1, the data repository stores data features (144) for users A-N (142A-142N). The data features may contain any type of data obtained for the users. Consider, for example, a software application (110) facilitating the filing of an income tax return. In such a scenario, data features may be user data features that include user identification information (e.g., first name, last name), user financial information (income, income tax withholdings, account balances, debt, etc.), user demographics (e.g., location, age, marital status, employment, etc.).

The data repository (140) may further store statistical tree structures (146). In one or more embodiments, a statistical tree structure is a data structure that is established for a statistic on an unknown set of elements (e.g., large population of elements). For example, the elements may be people, faults issued by a computing system, network events, software applications, or any other item type for which statistics are generated. The statistic is a statistic about a data label, where the data label is one of the data features of the set of elements.

The statistical tree structure sequentially branches to organize the elements into subsets by leaf nodes of the statistical tree structure, as discussed in detail below. Each subset may have characteristics that are statistically more suitable than the full set of elements. The statistical tree structure includes nodes corresponding to subsets of the elements. The nodes may be parent nodes and child nodes. The top-most parent node is the root node having the population of elements. The bottom-most child nodes are the leaf nodes. Nodes between the root node and the leaf nodes are intermediate nodes. Intermediate nodes are both child nodes and parent nodes. Child nodes of a particular parent node are a segmentation of a statistic, and thus, corresponding to subsets of the elements of the parent node. In other words, the statistical tree structure may partition on a statistic. More specifically, child nodes of a parent node are a partitioning of the statistic in the parent node based on a single data feature. Thus, the parent node provides branching to the child nodes based on the value of the single data feature of the parent node. As such, each parent node corresponds to segmentation of a statistic and a single data feature for partitioning.

By way of example of the population being people or organizations, the statistical tree structure may be established for the users (142A-142N). For users (142A-142N), the statistical tree structure organizes the users according to values of user data features. For example, if the data feature is income level at the parent node, the first child node may be for users having the value in the defined range of high income, the second child node may be for users having the value in the defined range of medium income, and the third child node for users having the value in the defined range of low income.

These and other aspects are discussed below with reference to the example statistical tree structure shown in FIG. 4.

A statistical tree structure may be trained using the data features (144) by the statistical tree structure training module (150) executing the method of FIG. 2. Multiple or many statistical tree structures (140) may be generated. For example, referring to the previously introduced example of an income tax return software, one statistical tree structure may be trained to enable a statistical analysis of user income, another statistical tree structure may be trained to enable statistical analysis of income tax withheld, etc. In the flowcharts, discussed below, the users (142A-142N) being used for generating statistical tree structures are referred to as "reference users", to indicate that these users are relied upon when generating statistical tree structures, and to distinguish them from other users which may later be statistically assed based on the statistical tree structures.

The statistical tree structure training module (150), in one or more embodiments, is configured to generate statistical tree structures (146), which may be stored in the data repository (140). The statistical tree structure training module (150) may execute one or more of the steps described in FIG. 2. A detailed description is provided below with reference to FIG. 2.

The evaluation module (160), in one or more embodiments, is configured to assess data based on the statistical tree structures generated by the statistical tree structure training module (150). The evaluation module (160) may execute one or more of the steps described in FIG. 3. A detailed description is provided below with reference to FIG. 3. In addition, multiple use case scenarios are described to show possible applications.

While FIG. 1 shows a configuration of components, other configurations may be used without departing from the scope of the invention. For example, various components may be combined to create a single component. As another example, the functionality performed by a single component may be performed by two or more components. Also, while the statistics system (130) is described as a system operating on data (e.g., data features (144)), those skilled in the art will appreciate that the described methods are equally applicable to other data that is not necessarily related to users. In other words, the methods are generally applicable to any type of subject.

FIG. 2 and FIG. 3 show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 2, a flowchart describing a method for generating a statistical tree structure, in accordance with one or more embodiments of the disclosure, is shown. In one or more embodiments, the method is performed prior to execution of the method of FIG. 3, which uses the statistical tree structures as they may be created using the method of FIG. 2. The method of FIG. 2 may be executed as soon as data becomes available, or at any other time prior to the execution of the method of FIG. 3. The method of FIG. 2 may be re-executed, for example, when data changes. The following description repeatedly refers to FIG. 4, which shows an example of a statistical tree structure.

In Step 200, a data label is selected from the data features associated with reference users. The reference users may be users with data features stored in a data repository. The data label identifies the data feature for which one or more types of statistical analysis may be performed once a statistical tree structure is completed. Assume, for example, that the data features stored in a data repository include "age_taxpayer", "amount_total_deductions", "business_code", "amount_self employment_tax", "num_dependents", "amount_salaries_and_wages", and "contract_labor_expenses". For each reference user, values for at least some of these data features are available in the data repository. For the generation of the statistical tree structure, assume that the data feature "contract_labor_expenses" is picked as the data label. Using this data label, the example statistical tree structure (400) of FIG. 4 is constructed. The resulting statistical tree structure allows statistical analysis for contract labor expenses, as discussed in detail below. Many other statistical tree structures could be constructed. For example, to statistically analyze the age of a taxpayer, a statistical tree structure for the data label "age_taxpayer" may be constructed.

In Step 202, a data feature is selected to generate the statistical tree structure. The data feature is selected from the data features associated with the reference users. Any data feature with the exception of the data feature selected as the data label may be picked. More specifically, the data feature is selected to introduce a branching of the statistical tree structure at the current node. In one or more embodiments, the branching is a binary branching and the statistical tree structure is a binary tree. In one or more embodiments, the selected data feature is the data feature which minimizes a variance in the data values for the data label, below the binary branching.

Figure 4:
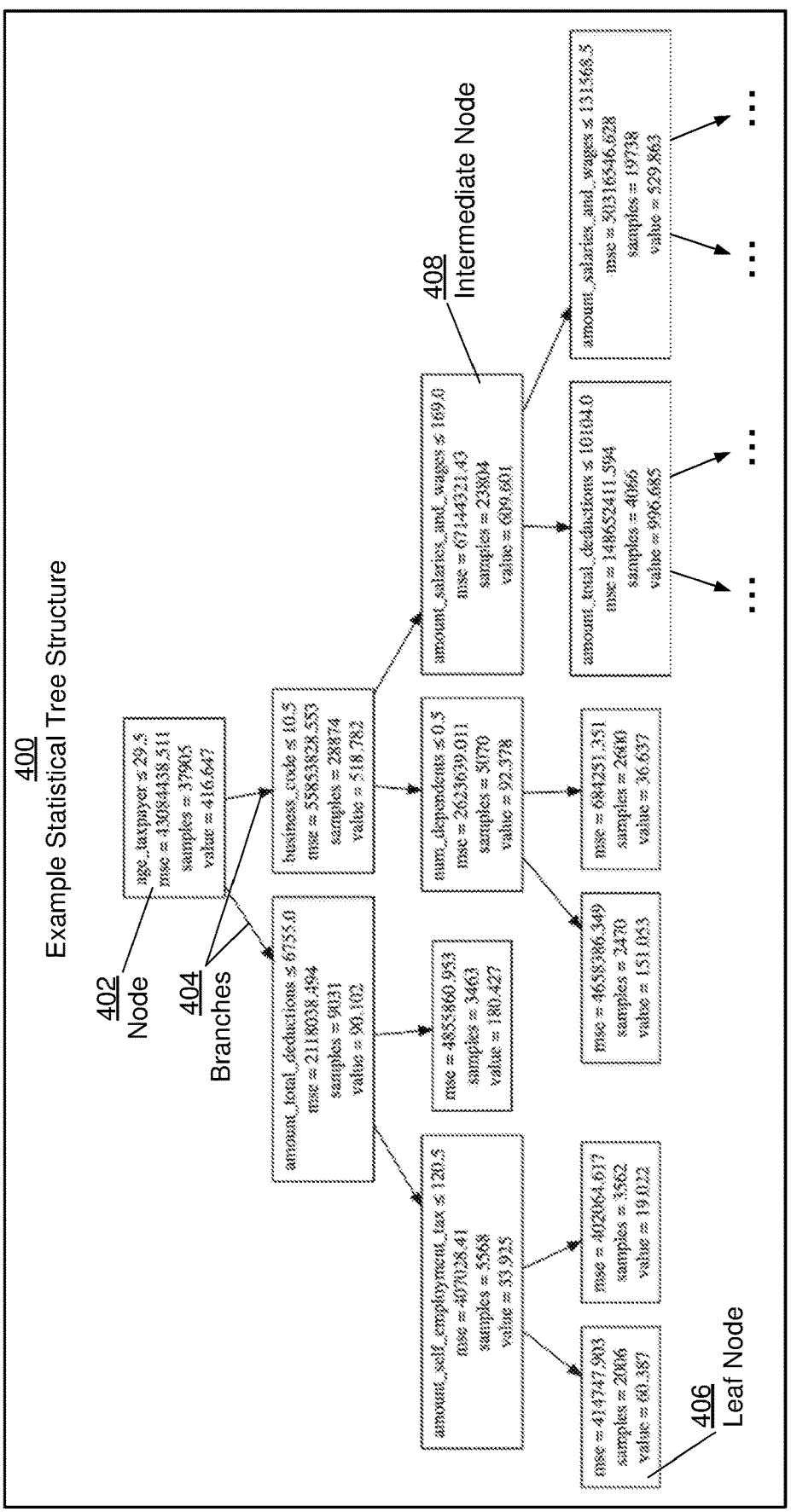
FIG. 4 shows an example statistical tree structure, in accordance with one or more embodiments.

In the example statistical tree structure (400) of FIG. 4, "age_taxpayer" is found to allow minimization of the variance in the data values of the data label "contract_labor_expenses". Accordingly, "age_taxpayer" is used as the data feature to split the statistical tree structure into two branches (404) at the first (topmost) node (402). In this case, the variance of the data values of the data label "contract_labor_expenses" in the child nodes of node (402) is less when using the data feature "age_taxpayer" in comparison to other choices of the data feature such as, for example, "amount_total_deductions", "business_code", "amount_self employment_tax", etc.

Identifying the data feature to be used for the binary branching can be based on the correlations between candidate data features considered for the binary branching and the data label. The data feature having the highest correlation with the data label may be the best candidate for the binary branching because this choice may minimize the variance below the binary branching. The mean squared error (MSE) or other methods may be used to assess correlation. As Steps 202, 204, and 206 are repeated, additional splits may be introduced. In the example statistical tree structure (400) of FIG. 4, a second set of splits is performed using "amount_total_deductions" and "business_code", which again may be chosen to minimize variance. These splits may be continued until leaf nodes are reached, as described below. Additional aspects of the splitting are described in Step 204.

In Step 204, the reference elements considered for the statistical tree structure are assigned to the branches at the current node. First, a threshold is established to assign the reference elements to a true or a false branch. Analogous to the choice of the data feature to be used for the binary branching performed in Step 202, the threshold may also be selected to minimize the variance in the data values for the data label.

In the example of FIG. 4, the threshold is set to 29.5 years (age_taxpayer<=29.5), to assign users for which the condition is true to the left branch, and to assign users for which the condition is false to the right branch. To illustrate the choice of this threshold, hypothetically assume that there are only four taxpayers to be processed by the example statistical tree structure (400). Taxpayer 1 is 22 years old and the associated contract labor expenses are $500. Taxpayer 2 is 29 years old and the associated contract labor expenses are $550. Taxpayer 3 is 30 years old and the associated contract labor expenses are $6,000. Taxpayer 1 is 75 years old and the associated contract labor expenses are $5,500. In this scenario, to obtain the minimum variance in the data values for the contract labor expenses below the binary branching, the threshold is set to 29.5 years, thereby separating taxpayers 1 and 2 from taxpayers 3 and 4. As a result, the left branch represents taxpayers 1 and 2 with contract labor expenses of $500 and $550, respectively, and the right branch represents taxpayers 3 and 4 with contract labor expenses of $6,000 and $5,500, respectively. As additional splits are performed in a descending order, the reference users are assigned to branches until the leaf nodes are reached. The optimal choice of a data feature (Step 202) and a threshold (Step 204) for branching may be incrementally determined. Specifically, Steps 202 and 204 may be repeatedly executed many times for different combinations of a data feature and a threshold until a minimum variance is detected. For example, any combination of a possible data features and possible threshold values may be tested.

In Step 206, a test is performed to determine whether a termination criterion is reached, to stop further branching. The termination criterion is the criterion by which branching is stopped. The termination criterion may be the number of elements assigned to a branch descending from the current node. Once that number drops below an initially specified minimum, further branching may not be allowed. Assume that in the example of FIG. 4, the number of elements specified in the termination criterion is 4,000. The leaf nodes include 2,006, 3,562, 2,470, and 2,600 users, respectively. Accordingly, no further branching is allowed. In contrast the two rightmost nodes in the bottom row include 4,066 and 19,738 elements, thus still allowing additional branching.

The test may be performed for each of the branches from the current nodes of the statistical tree structure. If a determination is made that the termination criterion is met, no more branching is performed. In this case, the next node is considered a leaf node terminating the branch, and the method may proceed with the execution of Step 208. Alternatively, if a determination is made that the termination criterion is not met, the branching may continue with a new set of current nodes by re-executing Steps 202 and 204. In the example statistical tree structure (400) of FIG. 4, during the first execution of Steps 202 and 204, one current node (the top-most node) is available for the branching. During the second execution of Steps 202 and 204, two current nodes are available for branching. Eventually, during the fourth execution of Steps 202 and 204, the bottom-most row of nodes includes four leaf nodes (406) and two additional nodes that qualify for a further branching.

While in the above description the termination criterion is based on a minimum number of samples in the leaf nodes, other termination criteria may be implemented as an alternative, or in addition. For example, a leaf node may be automatically identified when the variance of the data values for the data label in a branch descending from a node reaches zero.

In Step 208, statistics are computed for the nodes of the statistical tree structure. The statistics may be computed for the leaf nodes only, or for all nodes. The statistics may be for the data label. The statistics may include, but are not limited to, mean and/or standard deviation, mean squared error, variance, density estimates based on histograms or kernel density estimation, quantiles, probabilities of a certain value, etc.

In one or more embodiments, after the execution of the method of FIG. 2, statistics are available for the data label. When obtaining the statistics over the entire dataset of all reference elements without consideration of the different data features, the variance obtained for the values associated with the data label may be very high. Such statistics may not be particularly meaningful or useful. In contrast, executing the method of FIG. 2 divides the dataset into smaller cohorts of reference elements, based on the features, in accordance with one or more embodiments. Within the smaller cohorts of reference elements, the variance may be significantly reduced, thus enabling the computation of useful statistics. The method of FIG. 2 may be performed for many different data labels, for different groups of reference users, for different time intervals, etc. The statistics may be used as subsequently described with reference to FIG. 3.

Turning to FIG. 3, a flowchart describing the assessment of data of a target, based on a statistical tree structure, in accordance with one or more embodiments of the disclosure, is shown. The method of FIG. 3 may be executed when target data of a target becomes available. Target data may be any type of data that is to be interpreted in view of the statistical characteristics obtained as described in the flowchart of FIG. 2. Broadly speaking, the data to be interpreted corresponds to a data feature of reference elements, for which a statistical tree structure was generated, as described in FIG. 2. For example, FIG. 3 may be performed to determine whether a data value of the target data is an outlier. Various example applications are described below, following the description of the flowchart of FIG. 3.

In Step 300, for the target, values for the data features and the data label are obtained. The term "target" is used to identify an element whose data is to be statistically analyzed using a statistical tree structure. Broadly speaking, the values for the data features and the data label to be obtained for the target are based on the features that were obtained for the reference elements when the statistical tree structure was constructed, although with different values for the features. However, as discussed below, not all values of the features in the statistical tree structure are necessarily available for the target.

In Step 302, a current node of the statistical tree structure is selected. Initially, the current node may be the first (topmost) node of the statistical tree structure. Later current nodes may be nodes selected in a descending order, as described in the following steps. Steps 302-310 correspond to traversing the statistical data tree in one or more embodiments.

In Step 304, a test is performed to determine whether the value of the data feature for the branching at the current node is available for the target. A node, as previously described in Step 204 of FIG. 2, includes a threshold based on which either the true or false branch of the node is selected. A true or false branch may only be selected if the value for the data feature to be used for the test is available for the target user. Accordingly, if the value is available, the method may proceed with the execution of Step 306, to follow the branch that corresponds to the value. If the value is not available, a branch cannot be selected. In this case, the method may proceed with the execution of Step 308, to follow both branches.

Referring to the example statistical tree structure (400) of FIG. 4, assume that the value for the data feature "age_taxpayer" is not available for the target user. Accordingly, rather than continuing on either the true branch or the false branch, both branches may be followed. As a result, upon traversing the entire statistical tree structure, two rather than one leaf nodes are reached. Additional values for other features may be missing, causing additional leaf nodes to be reached.

In Step 310, a test is performed to determine whether a leaf node has been reached. If multiple branches are followed in parallel, the test may be performed for each of the branches. A leaf node is reached when the node for which Step 310 is performed does not have branches for exiting the node. If a leaf node has not yet been reached, the method may proceed to Step 302 to continue branching from the current node. This may repeat, until a leaf node is eventually reached. Once the leaf node(s) is/are reached, the method may proceed with Step 312.

When reaching Step 312, the target has been assigned to one leaf node (if the data includes values for all data features of the statistical tree structure) or multiple leaf nodes (if one or more values are missing), based on the traversing of the statistical tree structure in Steps 302-310. In Step 312, the value for the data label of the target is assessed in view of the statistics obtained for the statistical tree structure. More specifically, the value may be analyzed based on the statistics of the leaf node(s) to which the target was assigned. For example, the value may be compared against the distribution of feature values of the reference users found in the leaf node. If the target was assigned to multiple leaf nodes, the value may be assessed for all of these leaf nodes. To compare the value associated with the target against the distribution of the multiple leaf nodes, a total distribution may be computed based on a weighted average of the multiple leaf node distributions. The weighting may be performed based on the number of samples per leaf node.

FIG. 4 shows an example of a statistical tree structure (400), in accordance with one or more embodiments. The statistical tree structure includes a set of hierarchically organized nodes (402) and branches from a top-most node via intermediate nodes (408) to leaf nodes (406). Branching is binary, and each branch establishes a link between a parent node and a child node. The statistical tree structure (400) is specific to the data label "contract_labor_expenses", i.e., the tree structure is designed to perform operations for contract labor expenses. Each node (402) of the statistical tree structure (400) includes four entries.

The first entry of the node (402) identifies the data feature that is used for the branching below the node (402). For example, at the topmost node, "age_taxpayer" is the data feature that is used for the branching. To implement a binary branching, a threshold is further implemented. For example, at the topmost node, the threshold is set to 29.5 years (age_taxpayer$<=$29.5), to assign users for which the condition is true to the left branch, and to assign users for which the condition is false to the right branch. The data features that are used for the branching at the nodes and the thresholds are determined as described in FIG. 2.

The second entry of the node (402) is a mean squared error (MSE) for the values of the data label. The MSE is used as an indicator for the variance of the values of the data labels for all users of the node. Typically, as the tree branches and users get distributed among the nodes, the MSE decreases. A lower MSE indicates a lower variance, which may be advantageous for certain statistical operations. In the statistical tree structure (400), the MSE for the leaf nodes (406) is consistently lower than the MSE for the topmost node.

The third entry of the node (402) is the number of reference elements at the node. In the statistical tree structure (400), the number of reference elements is the number of users being considered when generating the statistical tree structure, as described in FIG. 2. The number of reference elements at the topmost node is 37,905. In other words, the entire statistical tree structure (400) is generated from a total of 37,905 users. These users are then distributed among the generated nodes. For example, when branching at the topmost node, 9,031 users are assigned to a node via the left branch, and 28,874 users are assigned to a node via the right branch.

The fourth entry of the node (402) is the value of the data label at the node. The value may be, for example, a mean. At the topmost node of the statistical tree structure (400), the mean may be calculated based on 37,905 values of the data label.

The following examples are intended to illustrate the utility of embodiments of the disclosure. Many other applications exist, in particular where higher-dimensional data, is to be statistically analyzed.

Anomaly or outlier detection: When detecting a value that is unlikely according to the distribution found in the leaf node, it may be concluded that the value is an outlier. In the example of tax software, the implication is that the outlier may be flagged to signal an increased audit risk and/or errors. In another example, in an optical character recognition (OCR) task or a speech to text conversion, the anomaly detection may be applied to data that is extracted to detect transcription errors. Consider scanned tax forms whose content is processed using OCR. Such tax forms typically have data fields for numerical entries. When the detected numerical value deviates from the typical distribution, one may conclude that the OCR has failed.

Augmentation of agent expertise: The predictions, such as the distributions in the leaf nodes, may be used to augment agent expertise (e.g., in user support applications). More specifically, the statistics computed as described in FIG. 2 may be provided to a support agent. The support agent may then use the statistics to guide a customer reaching out for support. For example, the statistics may allow the support agent to rapidly assess where the customer stands relative to the statistics, and whether there are outliers in the user's data. Consider, for example, an electronically performed income tax return. Using the statistics and the user's actual data, problem areas in the tax return may be identified based on the outliers. Detecting and addressing the problem areas may then result in various positive outcomes for the customer. For example, an audit risk may be reduced, missed deductions may be detected, etc.

Informing a user: The predictions may be used to provide an informative estimate to a user. Consider, for example, a software application facilitating the preparation of income tax returns. The software application may include a tax refund estimate. If the tax refund is determined deterministically, it may fluctuate wildly as the user enters additional information. The usefulness, at least during an early stage of entering information may, thus, be limited. In contrast, when a probability distribution-based estimate is used, a more informative and robust tax refund estimate may be provided. The tax refund estimate may be provided as a range that narrows as more information is entered. Specifically, as the statistical tree structure is traversed, with little information (few features) available, multiple leaf nodes may be reached, and the obtained distribution may be relatively broad. The initial tax refund estimate may, thus, have a broad range. With more information (additional features) becoming available, fewer leaf nodes are reached, and once all features of the statistical tree structure are available, a single leaf node may be reached, thus making the tax refund estimate increasingly accurate.

Adjusting a workflow for increased efficiency: The predictions may be used to adjust a workflow to increase efficiency. Consider, for example, a software application facilitating the preparation of income tax returns. Assuming no prior knowledge, the software application would have to acquire a comprehensive data set from the user in order to perform tax calculations. The data set may be acquired by sequentially asking the user for input on different topics. In contrast, using the statistical tree structure, the relevance of certain topics may be clear and the topics may be prioritized accordingly: Topics of high priority may correspond to features that appear early in the statistical tree structure, whereas topics of lower priority may correspond to features that appear late in the statistical tree structure, further downstream. Accordingly, based on the statistical tree structure when trying to optimize for answering a particular question, the more relevant data for answering the question may be acquired first.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIG. 5A and FIG. 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for computer estimations based on statistical tree structures, the method comprising:
    obtaining a statistical tree structure for a plurality of reference elements, the statistical tree structure comprising:
        a plurality of leaf nodes segmenting a statistic for a data label according to a plurality of data features in the plurality of reference elements, and
        a plurality of intermediate nodes connecting a first node to the plurality of leaf nodes, wherein the first node and each of the plurality of intermediate nodes provide a branching based on one of the plurality of data features,
wherein the statistical tree structure comprises the statistic at the plurality of leaf nodes, based on a subset of the plurality of reference elements assigned to each of the plurality of leaf nodes;
obtaining target data comprising:
a plurality of values for the plurality of data features, and
a value for the data label;
selecting the first node of the statistical tree structure;
traversing the statistical tree structure to a first leaf node, the traversing comprising matching one of the plurality of values for the plurality of data features to the branching of one of the plurality of intermediate nodes; and
assessing the value for the data label in view of the statistic associated with the first leaf node.

2. The method of claim 1, wherein matching one of the plurality of values of the plurality of data features to the branching of one of the plurality of intermediate nodes comprises:
following a first branch of two branches of the first node, based on the one of the plurality of values of the plurality of data features.

3. The method of claim 2, wherein the traversing further comprises:
following a second branch in addition to the first of the two branches of the first node, based on the one of the plurality of values of the plurality of data features not being available;
reaching a second leaf node in addition to the first leaf node of the plurality of leaf nodes; and
assessing the value for the data label in the target data in view of the statistic associated with the second leaf node,
wherein the statistic associated with the first leaf node and the statistic associated with the second leaf node are combined.

4. The method of claim 1, wherein the statistical tree structure is previously generated based on the plurality of reference elements, the plurality of reference elements determining a branching of the statistical tree structure from the first node to the plurality of leaf nodes.

5. The method of claim 1, wherein computing the statistic at the first leaf node comprises obtaining at least one selected from a group consisting of:
a mean,
a standard deviation,
a mean squared error,
a variance,
a density estimates;
quantiles, and
a probability of a certain numerical value,
computed from the values of the data label associated with the reference elements assigned to the first leaf node.

6. The method of claim 1, wherein assessing the value in the target data in view of the statistic comprises detecting an outlier based on the value of the data label and the statistic associated with the first leaf node.

7. The method of claim 1, wherein assessing the value for the data label in view of the statistic comprises augmenting agent expertise by sharing the statistic associated with the first leaf node with a support agent.

8. The method of claim 1, further comprising:
repeatedly assessing the target data as more values for the plurality of data features become available, to provide an increasingly accurate statistical assessment.

9. The method of claim 1, further comprising:
gathering the plurality of values for the plurality of data features in an order reflecting a descending order of the statistical tree structure.

10. A method for computer estimations based on statistical tree structures, the method comprising:
obtaining a statistical tree structure for a plurality of reference elements, the statistical tree structure comprising:
a plurality of leaf nodes segmenting a statistic for a data label according to a plurality of data features in the plurality of reference elements, and
a plurality of intermediate nodes connecting a first node to the plurality of leaf nodes, wherein the first node and each of the plurality of intermediate nodes provide a branching based on one of the plurality of data features,
wherein the obtaining of the statistical tree structure comprises:
branching into two branches at the first node based on a condition established using a first data feature of the plurality of data features;
assigning a first subset of the plurality of reference elements to a first branch of the two branches, based on values of the first data feature of the first subset of the plurality of reference elements meeting the condition; and
assigning a second subset of the plurality of reference elements to a second branch of the two branches, based on the values of the first data feature of the second subset of the plurality of reference elements not meeting the condition,
wherein the condition is selected to minimize a variance of the values of the first data feature of the first subset and a variance of the values of the first data feature of the second subset.

11. The method of claim 10, wherein obtaining the statistical tree structure further comprises computing the statistic at the plurality of leaf nodes, based on a subset of the plurality of reference elements assigned to each of the plurality of leaf nodes.

12. The method of claim 10, wherein computing the statistic at a first leaf node of the plurality of leaf nodes comprises obtaining at least one selected from a group consisting of:
a mean,
a standard deviation,
a mean squared error,
a variance,
a density estimates;
quantiles, and
a probability of a certain numerical value,
computed from the values of the data label associated with the reference elements assigned to the first leaf node.

13. The method of claim 10, wherein obtaining the statistical tree structure further comprises a repetition of the branching into two branches until a termination criterion is reached.

14. The method of claim 13, wherein the termination criterion specifies a minimum required number of reference elements assigned to a branch resulting from the branching.

15. A system for computer estimations based on statistical tree structures, the system comprising:
- a computer processor;
- a statistical tree structure training module executing on the computer processor configured to obtain a statistical tree structure for a plurality of reference elements, the statistical tree structure comprising:
  - a plurality of leaf nodes segmenting a statistic for a data label according to a plurality of data features, and
  - a plurality of intermediate nodes connecting a first node to the plurality of leaf nodes, wherein the first node and each of the plurality of intermediate nodes provide a branching based on one of the plurality of data features,
  - wherein the statistical tree structure comprises the statistic at the plurality of leaf nodes, based on a subset of the plurality of reference elements assigned to each of the plurality of leaf nodes; and
- an evaluation module executing on the computer processor configured to:
  - obtain target data comprising:
    - a plurality of values for the plurality of data features, and
    - a value for the data label;
  - select the first node of the statistical tree structure in a descending order, the first node being associated with a first data feature of the plurality of data features;
  - traverse the statistical tree structure to a first leaf node by matching one of the plurality of values for the plurality of data features to the branching of one of the plurality of intermediate nodes; and
  - assess the value for the data label in the target data in view of the statistic associated with the first leaf node.

16. The system of claim 15, wherein matching one of the plurality of values of the plurality of data features to the branching of one of the plurality of intermediate nodes comprises:
- following a first branch of two branches of the first node, based on the one of the plurality of values of the plurality of data features;
- following a second branch in addition to the first of the two branches of the first node, based on the one of the plurality of values of the plurality of data features not being available;
- reaching a second leaf node in addition to the first leaf node of the plurality of leaf nodes; and
- assessing the value for the data label in the target data in view of the statistic associated with the second leaf node,
- wherein the statistic associated with the first leaf node and the statistic associated with the second leaf node are combined.

17. The system of claim 15, wherein obtaining the statistical tree structure for the plurality of reference elements comprises:
- branching into two branches at the first node based on a condition established using the first data feature;
- assigning a first subset of the plurality of reference elements to a first branch of the two branches, based on values of the first data feature of the first subset of the plurality of reference elements meeting the condition; and
- assigning a second subset of the plurality of reference elements to a second branch of the two branches, based on the values of the first data feature of the second subset of the plurality of reference elements not meeting the condition,
  - wherein the condition is selected to minimize a variance of the values of the first data feature of the first subset and a variance of the values of the first data feature of the second subset.

18. The system of claim 15, wherein computing the statistic at the first leaf node comprises obtaining at least one selected from a group consisting of:
- a mean,
- a standard deviation,
- a mean squared error,
- a variance,
- a density estimates;
- quantiles, and
- a probability of a certain numerical value, computed from the values of the data label associated with the reference elements assigned to the first leaf node.

19. A system for computer estimations based on statistical tree structures, the system comprising:
- a computer processor;
- a statistical tree structure training module executing on the computer processor configured to obtain a statistical tree structure for a plurality of reference elements, the statistical tree structure comprising:
  - a plurality of leaf nodes segmenting a statistic for a data label according to a plurality of data features, and
  - a plurality of intermediate nodes connecting a first node to the plurality of leaf nodes, wherein the first node and each of the plurality of intermediate nodes provide a branching based on one of the plurality of data features; and
- an evaluation module executing on the computer processor configured to obtain the statistical tree structure by:
  - branching into two branches at the first node based on a condition established using a first data feature of the plurality of data features;
  - assigning a first subset of the plurality of reference elements to a first branch of the two branches, based on values of the first data feature of the first subset of the plurality of reference elements meeting the condition; and
  - assigning a second subset of the plurality of reference elements to a second branch of the two branches, based on the values of the first data feature of the second subset of the plurality of reference elements not meeting the condition,
    - wherein the condition is selected to minimize a variance of the values of the first data feature of the first subset and a variance of the values of the first data feature of the second subset.

* * * * *

UNITED STATES PATENT AND TRADEMARK OFFICE
CERTIFICATE OF CORRECTION

PATENT NO. : 11,409,732 B2
APPLICATION NO. : 16/745604
DATED : August 9, 2022
INVENTOR(S) : Vitor R. Carvalho et al.

Page 1 of 1

It is certified that error appears in the above-identified patent and that said Letters Patent is hereby corrected as shown below:

In the Claims

At Column 17, Claim number 3, Line number 36, "... the data label in the target data in view of the ...." should read -- ... the data label in view of the ... --;

At Column 17, Claim number 5, Line number 55, "a density estimates;" should read -- a density estimates --;

At Column 18, Claim number 12, Line number 56, "a density estimates;" should read -- a density estimates --;

At Column 20, Claim number 18, Line number 21, "a density estimates;" should read -- a density estimates --.

Signed and Sealed this
First Day of November, 2022

Katherine Kelly Vidal
*Director of the United States Patent and Trademark Office*